United States Patent
Hallivuori

(10) Patent No.: US 7,822,047 B2
(45) Date of Patent: Oct. 26, 2010

(54) METHOD AND ARRANGEMENT FOR PROCESSING MANAGEMENT AND CONTROL MESSAGES

(75) Inventor: Ville Hallivuori, Espoo (FI)

(73) Assignee: Tellabs Oy, Espoo (FI)

( * ) Notice: Subject to any disclaimer, the term of this patent is extended or adjusted under 35 U.S.C. 154(b) by 464 days.

(21) Appl. No.: 11/822,203

(22) Filed: Jul. 3, 2007

(65) Prior Publication Data
US 2008/0008174 A1 Jan. 10, 2008

(30) Foreign Application Priority Data
Jul. 4, 2006 (FI) .................. 20060650

(51) Int. Cl.
*H04L 12/28* (2006.01)

(52) U.S. Cl. ...................... 370/401; 370/241

(58) Field of Classification Search ........ None
See application file for complete search history.

(56) References Cited

U.S. PATENT DOCUMENTS

| | | | |
|---|---|---|---|
| 6,768,716 | B1 | 7/2004 | Abel |
| 7,003,574 | B1 * | 2/2006 | Bahl ........................ 709/228 |
| 7,199,943 | B2 * | 4/2007 | Kashiki ..................... 359/689 |
| 7,206,313 | B2 * | 4/2007 | Maher et al. ............... 370/401 |
| 7,561,527 | B1 * | 7/2009 | Katz et al. ................. 370/241 |
| 2006/0209685 | A1 | 9/2006 | Rahman et al. |
| 2006/0271699 | A1 * | 11/2006 | Lee et al. ................... 709/230 |

2007/0058555 A1 3/2007 Blair et al.

FOREIGN PATENT DOCUMENTS

| | | |
|---|---|---|
| EP | 1 511 229 | 3/2005 |
| EP | 1 650 908 | 4/2006 |
| WO | 2007/016841 A1 | 2/2007 |
| WO | 2007/025427 A1 | 3/2007 |

OTHER PUBLICATIONS

Kencl et al., "Adaptive Load Sharing for Network Processors", Proceedings IEEE Infocom 2002, vol. 1, Jun. 2002, pp. 545-554, XP010593615.
Bux et al., "Technologies and Building Blocks for Fast Packet Forwarding", IEEE Communications Magazine, vol. 39, No. 1, Jan. 2001, pp. 70-77, XP011091407.
Katz et al., "Bidrectional Forward Detection (BFD)," Network Working Group Internet Draft, www.ietf.org/internet.draft-ietf-bfd-base-05.txt (Jun. 14, 2006).

* cited by examiner

*Primary Examiner*—Robert W Wilson
(74) *Attorney, Agent, or Firm*—Young & Thompson

(57) ABSTRACT

In a processing management or control messages in a packet or cell switched data network, a protocol packet (131) is provided with a selection identifier that indicates the sub-system (145) of the receiving network element (102), which sub-system operates the management and/or control session connected to said protocol packet. Now that sub-system (144) of the receiving network element that receives said protocol packet (131), is capable of conducting the information contained in said protocol packet to the appropriate sub-system (145) of the receiving network element (102) on the basis of said selection identifier.

29 Claims, 4 Drawing Sheets

METHOD AND ARRANGEMENT FOR PROCESSING MANAGEMENT AND CONTROL MESSAGES

FIELD OF THE INVENTION

The invention relates to processing management and/or control messages in packet or cell switched data network.

BACKGROUND OF THE INVENTION

Packet or cell switched data network elements such as routers transmit between each other data transmission packets or cells that contain management or control messages. The operation of a data network is monitored by means of control messages, and possible errors in operation can be detected. The network elements that monitor the network by means of management messages can control the parameter settings of the network elements under control and gather the statistic data collected by the said network elements. In addition, the network routing topology can be adjusted by the management messages.

In this document, data transmission packets and cells containing management or control messages are called protocol packets. Protocol packets are used for instance in the BFD protocol (Bi-directional Forwarding Detection Protocol), by which network can for example control that a data transmission link between adjacent network elements, a route between two points in the data network or a tunnel defined in the data network is in proper order for operation.

A modern network element such as router generally includes several functional units, such as line cards, switch cards and control cards. A single functional unit includes one or more protocol processor that can be realized by an ASIC circuit (Application Specific Integrated Circuit), an FPGA component (Field Programmable Gate Array), a programmable network processor NPU (Network Processing Unit), a general purpose programmable processor or a combination of one or more of the following. The task of a protocol processor is to perform the processing operations of the data transmission packets received in the network element and of the data transmission packets transmitted from the network element, such as the selection of the correct transmission port on the basis of the target address provided in the data transmission packet.

In a situation where the network element has only one protocol processor, it is naturally possible to be sure that each protocol packet arriving in said network element must be processed by said protocol processor. The situation becomes more complicated, if the network element has several protocol processors, of which each processor operates the management or control sessions assigned for said protocol processor. Now there can arise a situation where a protocol processor A provided in the network element receives a protocol packet that represents the management or control session operated by a protocol processor B also provided in said network element. Said management or control session controls for example a data transmission channel, route or tunnel terminated in said network element.

DESCRIPTION OF THE PRIOR ART

In an arrangement according to the prior art, each protocol processor of the network element that can receive protocol packets is arranged also to perform those management or control operations that are connected to a management or control session operated by any other protocol packet of said network element. However, this kind of arrangement is extremely complex, because every protocol processor must at every point of time have mutually compatible real-time information of every active management or control session. There is required a reliable checking mechanism for ensuring that for instance the data contained in the protocol processor A regarding the situation of a management or control session does not at any point of time deviate from the corresponding data contained in the protocol processor B.

In another prior art arrangement, in every functional unit or protocol processor that can receive protocol packets there is kept a session mode table that connects the identifier of the management or control session contained in the protocol packet with the identifier of the functional unit or protocol processor operating said management or control session. Each protocol processor that can receive protocol packets is arranged to define, on the basis of said session mode table, that functional unit or protocol processor, to the management or control session operated by which said protocol packet is connected, and to transmit said protocol packet to the defined functional unit or protocol processor. This kind of arrangement is, however, very complicated, because the session mode table must cover all management or control sessions operated by said network element. The size of this kind of a session mode table can be even hundreds of thousands of lines, when the network element includes tens of protocol processors, each of which can operate even thousands of management or control sessions.

In a third prior art arrangement, in the network element there is kept a session mode table that is commonly used by all protocol processors or functional units, which table connects the identification of a management or control session contained in a protocol packet with the identifier of the functional unit or protocol processor operating said management or control session. Said commonly used session mode table must be arranged so that every protocol processor or functional unit has access to the data of said session mode table. In this kind of arrangement, there often are created jammed situations, i.e. the arrangement is not effective, if the network element includes many functional units or protocol processors that all tend to read the data of said session table.

BRIEF DESCRIPTION OF THE INVENTION

The invention relates to a method for processing protocol packets, by which method the limitations and drawbacks connected to the prior art can be eliminated or alleviated. The invention also relates to an arrangement for processing protocol packets, by which arrangement the limitations and drawbacks of the prior art can be eliminated or alleviated. The invention also relates to a data network element by which the limitations and drawbacks of the prior art can be eliminated or alleviated. The invention also relates to a computer program provided with program means for processing protocol packets, so that the limitations and drawbacks of the prior art can be eliminated or alleviated. Likewise the invention relates to a protocol processor provided with means for processing protocol packets, so that the limitations and drawbacks of the prior art can be eliminated or alleviated.

The object of the invention is achieved by an arrangement where the protocol packet is provided with a selection identifier that indicates the sub-system of the receiving network element which sub-system operates the management or control session connected to said protocol packet. The possible values of the selection identifier are arranged to fulfill the following conditions: for each sub-system located in the receiving network element, there is respectively provided no more than a predetermined number of selection identifier values, and at least one of the selection identifier values is available for use in connection with at least two simultaneous protocol sessions. Now that sub-system of the receiving network element that receives said protocol packet is capable of conducting the information contained in said protocol packet to the appropriate sub-system of the receiving network element on the basis of said selection identifier.

In this document, a network element sub-system that is identified by the selection identifier connected to the protocol packet is called a protocol processing unit. A protocol processing unit can be a single functional unit such as a line card, a switch card or a control card. A protocol processing can also be a predetermined group of several functional units. Moreover, a protocol processing unit can be a single protocol processor or a predetermined group of several protocol processors.

In this document, a management or control session is called a protocol session.

By means of the invention, there are achieved the following advantages:
- the need for memory capacity in the network element is decreased and the mode data maintenance work to be carried out is reduced, because by means of the invention, there is avoided the need to keep up a session mode table (session mode tables) that covers (each of which covers) all active protocol sessions, and
- the work load of the protocol processors is reduced, because the conducting of a received protocol packet to the appropriate network element sub-system can by means of the invention be carried out without a table search from a session mode table that covers all active protocol sessions.

A method according to the invention for processing protocol packets is characterized in that in the method:
- a protocol packet connected to a Bi-directional Forwarding Detection protocol session is in a first network element provided with a selection identifier, the possible values of which are arranged to fulfill the following conditions: for each protocol processing unit included in the second network element, there is respectively provided no more than a predetermined number of selection identifier values, and at least one of the selection identifier values is available for use in connection with at least two simultaneous Bi-directional Forwarding Detection protocol session,
- said protocol packet is transmitted from said first network element to said second network element,
- the protocol processing unit operating said Bi-directional Forwarding Detection protocol session is defined in said second network element among the number of said second network element protocol processing units, on the basis of said selection identifier, and
- at least part of the information contained in said protocol packet is transmitted in said second network element to the protocol processing unit operating said Bi-directional Forwarding Detection protocol session.

The arrangement according to the invention for processing protocol packets in a data network, including a first network element and a second network element, is characterized in that said first network element is arranged:
- to provide the protocol packet connected to the Bi-directional Forwarding Detection protocol session a selection identifier, the possible values of which are arranged to fulfill the following conditions: for each protocol processing unit arranged in said second network element, there is respectively arranged no more than a predetermined number of selection identifier values, and at least one of the selection identifier values is available for use in connection with at least two simultaneous Bi-directional Forwarding Detection protocol sessions, and
- to transmit said protocol packet to said second network element, and said second network element is arranged:
- to read the selection identifier including in the received protocol packet,
- to define the protocol processing unit operating said Bi-directional Forwarding Detection protocol session from among the group of the protocol processing units of said second network element on the basis of said selection identifier, and
- to transmit at least part of the information contained in said protocol packet to a protocol processing unit operating said Bi-directional Forwarding Detection protocol session.

A data network element according to the invention is characterized in that the network element includes:
- reading means for reading the selection identifier in the protocol packet representing the Bi-directional Forwarding Detection protocol session,
- definition means for defining the protocol processing unit operating said Bi-directional Forwarding Detection protocol session from among the number of processing units of the network element on the basis of said selection identifier, the possible values of which selection identifier are arranged to fulfill the following conditions: for each protocol processing unit included in the network element, there is respectively arranged no more than a predetermined number of selection identifier values, and at least one of the selection identifier values is available for use in connection with at least two simultaneous Bi-directional Forwarding Detection protocol sessions, and
- transmission means for transmitting at least part of the information contained by said protocol packet to the protocol processing unit operating said Bi-directional Forwarding Detection protocol session.

A computer program according to the invention for processing protocol packets is characterized in that the computer program includes:
- program means for instructing the network element of the data transmission network to read the selection identifier from the received protocol packet representing the Bi-directional Forwarding Detection protocol session,
- program means for instructing said network element to define the protocol processing unit operating said Bi-directional Forwarding Detection protocol session from among then number of the protocol processing units of the network element on the basis of said selection identifier, the possible values of which selection identifier are arranged to fulfill the following conditions: for each protocol processing unit included in said network element, there is respectively arranged no more than a predetermined number of selection identifier values, and at least one of the selection identifier values is available for use in connection with at least two simultaneous Bi-directional Forwarding Detection protocol sessions, and
- program means for instructing said network element to transmit at least part of the information contained in said protocol packet to a protocol processing unit operating said Bi-directional Forwarding Detection protocol session.

A protocol processor according to the invention, provided with an inlet port and an outlet port, for processing protocol packets is characterized in that the protocol processor includes:

reading means for reading the selection identifier from the protocol packet representing the Bi-directional Forwarding Detection protocol session received from said inlet port definition means for defining the protocol processing unit operating said Bi-directional Forwarding Detection protocol session from among the number of protocol processing units of the network element on the basis of said selection identifier, the possible values of said selection identifier being arranged to fulfill the following conditions: for each protocol processing unit located in the network element, there is respectively provided no more than a predetermined number of selection identifier values, and at least one of the selection identifier values is available for use in connection with at least two simultaneous Bi-directional Forwarding Detection protocol sessions, and transmission means for transmitting at least part of the information contained in said protocol packet to said outlet port.

The various embodiments of the invention are characterized by what is set forth in the dependent claims.

BRIEF DESCRIPTION OF THE DRAWINGS

The invention is explained in more detail with reference to the preferred embodiments described by way of example, and to the appended drawings where.

DETAILED DESCRIBED OF THE EMBODIMENTS OF THE INVENTION

Figure 1:
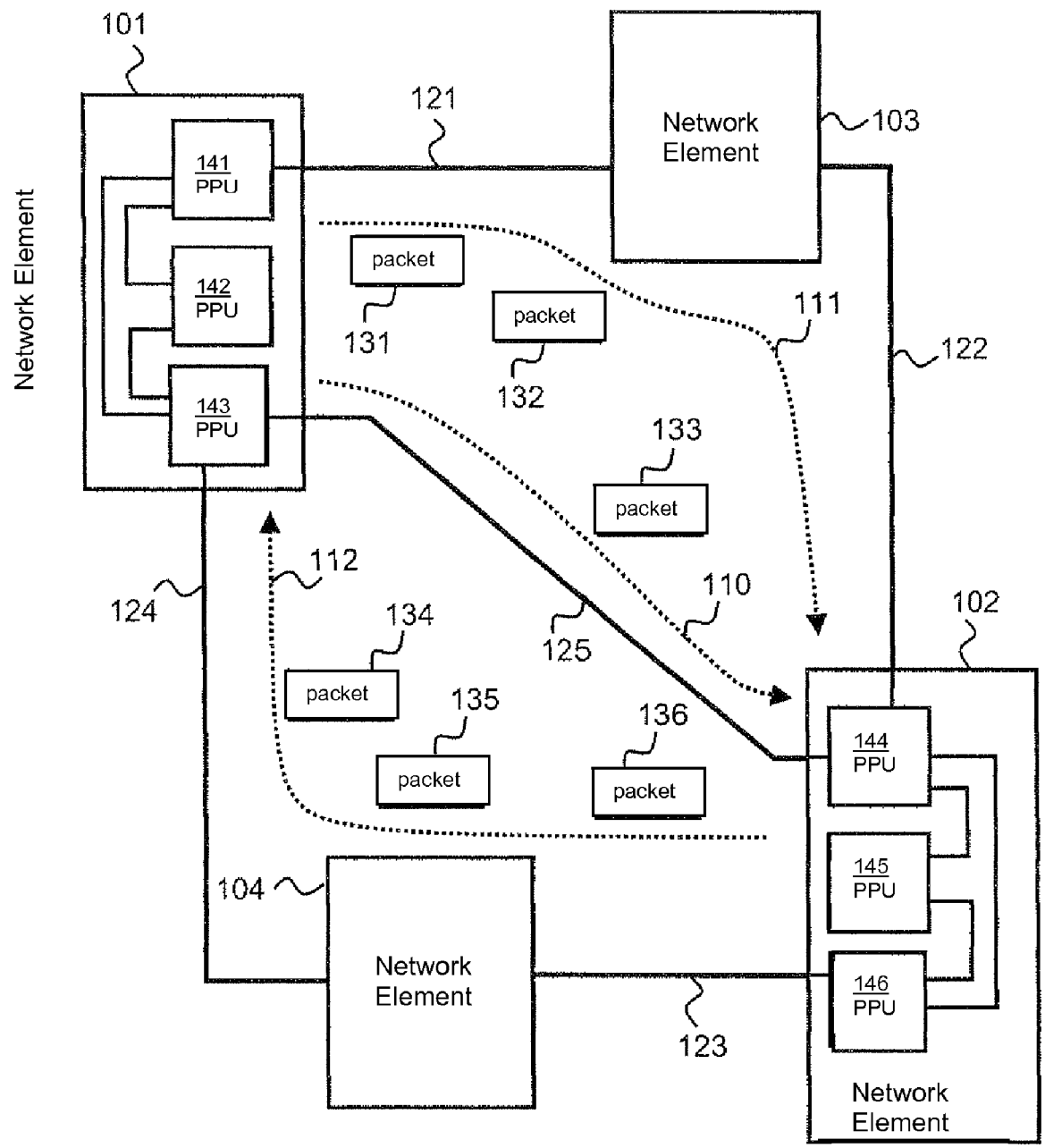
FIG. 1 illustrates an exemplary packet or cell switched data network using an arrangement according to an embodiment of the invention for processing protocol packets.

FIG. 1 illustrates an exemplary packet or cell switched data network using an arrangement according to the invention for processing protocol packets. The data network has a first network element 101 and a second network element 102. In addition, the data network also includes network elements 103 and 104. The network elements are interconnected by data transmission links 121-125. In this exemplary data network, the data transmission from the network element 101 to the network element 102 can proceed through two different routes 110 and 111 that are represented by dotted lines. The route 111 from the network element 101 to the network element 102 passes via the network element 103. The route 112 from the network element 102 to the network element 101 passes via the network element 104. The rectangles 131-133 represent protocol packets transmitted from the network element 101 to the network element 102, and the rectangles 134-136 represent protocol packets transmitted from the network element 102 to the network element 101. The network element 101 includes protocol processing units 141-143, and the network element 102 includes protocol processing units 144-146. The protocol processing unit 141 of the network element 101 is arranged to transmit data transmission packets to the data transmission link 121, and the protocol processing unit 143 is arranged to transmit data transmission packets to the data transmission link 125 and to receive data transmission packets from the data transmission link 124. The protocol processing unit 146 of the network element 102 is arranged to transmit data transmission packets to the data transmission link 123 and the protocol processing unit 144 is arranged to receive data transmission packets from the data transmission links 122 ja125.

For better illustrating the operation, let us assume that between the network elements 101 and 102, there are two protocol sessions A and B. The protocol packets connected to the protocol session A are transmitted from the network element 101 to the network element 102 along the route 111, and from the network element 102 to the network element 101 along the route 112. The protocol packets 131, 132, 134 and 135 are connected to the protocol session A. The protocol packets connected to the protocol session B are transmitted from the network element 101 to the network element 102 along the route 110, and from the network element 102 to the network element 101 along the route 112. The protocol packets 133 and 136 are connected to the protocol session B. The protocol session A is operated in the network element 101 by the protocol processing unit 141, and in the network element 102 by the protocol processing unit 145. Respectively the protocol session B is operated in the network element 101 by the protocol processing unit 142 and in the network element 102 by the protocol processing unit 146. The protocol session A can be for instance a control session controlling the operation of the routes 111 and 112, and the protocol session B can be for instance a control session controlling the operation of the routes 110 and 112. The operation of a protocol session can mean for example a time trigger function where the network element operating the protocol session in question gives to the network processing unit an alarm as a response to a situation where protocol packets should arrive, but the preset time has passed since the receiving of the last received protocol packet.

The network element 101 is arranged to provide the protocol packet 131-133 connected to the protocol session with a selection identifier and to transmit said protocol packet to the network element 102. The network element 102 is arranged to read the selection identifier of the received protocol packet 131-133, to define the protocol processing unit operating said protocol session from among the group 144-146 of protocol processing units of the network element 102 and to transmit at least part of the information contained in the received protocol packet to the protocol processing unit operating said protocol session. Naturally the transmission does not take place, if the protocol processing unit that received the protocol packet happens to be the same as the protocol processing unit operating said protocol session.

In this exemplary situation, said selection identifier is chosen so that in protocol packets connected to the protocol session A, which packets are received in the network element 102, the selection identifier has a value, on the basis of which the network element 102 defines the protocol processing unit 145 as the protocol processing unit operating the protocol session. Respectively in protocol packets connected to the protocol session B, which packets are received in the network element 102, the selection identifier has a value, on the basis of which the network element 102 defines the protocol processing unit 146 as the protocol processing unit processing the protocol session.

The possible values of the selection identifier are arranged to fulfill the following conditions:

for each protocol processing unit contained in the network element, there is respectively provided no more than a predetermined number of the selection identifier values, and at least one of the selection identifier values is available for use in connection with at least two simultaneous protocol sessions.

Advantageously at most one selection identifier value is arranged to correspond to each protocol processing unit contained in a network element. In that case the number of the different values of the selection identifier, which values are needed for defining the protocol processing units operating the protocol sessions, is equal to the number of those protocol processing units contained in the network element that are available for operating the protocol sessions.

In case more than one selection identifier value corresponds to the protocol processing unit contained in the network element, the alternative selection identifier values corresponding to the protocol processing unit can logically be connected to said protocol processing unit for example by a table, where the input data is the selection identifier and the output data is the identifier of said protocol processing unit. In case at most one selection identifier value is arranged to correspond to each protocol processing unit contained in the network element, the selection identifier can as such serve as the identifier of the protocol processing unit.

For the sake of example, let us observe a situation where the network element includes N protocol processing units that together operate a total of M simultaneous protocol sessions. Let us assume that at most one selection identifier value is arranged to correspond to the protocol processing unit contained in each network element. Now there are needed N different selection identifier values for defining the protocol processing units operating the protocol sessions. In case the protocol processing unit operating the protocol session were defining on the basis of the protocol session, there would be needed a table with M lines, each line corresponding to one protocol session. The number M can be even hundreds of thousands, while N is generally tens at most. The number M of the protocol sessions does not affect the number of the various values of the required selection identifiers, because at least one of the selection identifier values is available for use in connection with at least two simultaneous protocol sessions. Advantageously each selection identifier value corresponding to the protocol processing unit is available for use with any protocol session.

Advantageously the number $L(j)$ of the selection identifier values corresponding to each protocol processing unit $j$ ($j=1 \ldots N$) is chosen so that in a situation where the number M of the operated protocol sessions is higher than the number N of the protocol processing units (i.e. M>N), the total number of said selection identifier values is smaller than the number of said protocol sessions to be operated, i.e. $L(1)+L(2)+ \ldots +L(N)<M$.

In an arrangement according to an embodiment of the invention, the network element can include a protocol processing unit without any corresponding selection identifier value. This kind of situation happens for example when said protocol processing unit is not available for operating the protocol sessions.

In an arrangement according to an embodiment of the invention, the selection identifier can be a value, that does not correspond to any protocol processing unit. This kind of situation happens for example when the default value chosen for the selection identifier does not correspond to the protocol processing unit. The default value is used for example in situations where the value of the selection identifier that corresponds to the protocol processing unit is not known. A default-value selection identifier indicates for the protocol packet receiving network element that the transmitting network element has not been capable of forming a selection identifier corresponding to the protocol processing unit.

The network element 102 is arranged to provide the protocol packet 134-136 connected to the protocol session with a selection identifier and to transmit said protocol packet to the network element 101. The network element 101 is arranged to read the selection identifier contained in the received protocol packet 134-136, to define the protocol processing unit operating said protocol session from among the group 141-143 of the protocol processing units of the network element 101 and to transmit at least part of the information contained in the received protocol packet to said protocol processing unit operating said protocol session.

In this exemplary situation, said selection identifier is chosen so that in protocol packets connected to the protocol session A, which are received in the network element 101, the selection identifier is a value, on the basis of which the network element 101 defines the protocol processing unit 141 as the protocol processing unit operating the protocol session. Respectively, in protocol packets connected to the protocol session B, which are received in the network element 101, the selection identifier is a value, on the basis of which the network element 101 defines the protocol processing unit 142 as the protocol processing unit operating the protocol session.

In an arrangement according to an embodiment of the invention, the network element 102 is arranged to transmit to the network element 101 data, on the basis of which the selection identifier connected to the protocol packet to be transmitted can be formed in the network element 101. Respectively the network element 101 is arranged to transmit to the network element 102 data, on the basis of which the selection identifier connected to the protocol packet to be transmitted can be formed in the network element 102. Said information can only be transmitted once when starting the protocol session, or said information can be transmitted repeatedly in protocol packets during the protocol session.

The protocol session A can be started for example according to the following procedure, where it is assumed that the network element 102 starts said protocol session:

without restricting the general nature of the example, it can be assumed that the protocol session A to be started is in the network element 102 operated by the protocol processing unit 145, the network element 102 transmits to the network element 101 a protocol packet 134 that includes the data T145, which identifies the protocol processing unit 145, and the selection identifier contained in the protocol packet 134 still has a default value corresponding to the starting of the protocol session, the network element 101 receives the protocol packet 134, on the basis of which the network element 101 performs operations connected to the starting of the protocol session, such as the starting of required computer programs, and without restricting the general nature of the example it can be assumed that the protocol session A to be started is in the network element 101 operated by the protocol processing unit 141, the network element 101 forms, on the basis of the data T145 contained in the received protocol packet 134, the selection identifier V145, the network element 101 transmits to the network element 102 a protocol packet 131 containing the data T141 that identifies the protocol processing unit 141, and said selection identifier V145, the network element 102 forms, on the basis of the data T141 contained in the received protocol packet 131, the selection identifier V141.

After the initial step described above, the network element 102 provides the protocol packets to be transmitted and connected to the protocol session A with the selection identifier V141, and the network element 101 provides the protocol packets to be transmitted and connected to the protocol session A with the selection identifier V145.

The data on the basis of which the selection identifier is formed can as such serve as the selection identifier, in which case for example V141=T141, or the selection identifier and said data can have mutually different representations. Said information can include for instance more error correction or check-up bits than the selection identifier.

In an arrangement according to an embodiment of the invention, the network element 102 is arranged to form the protocol packet 134 containing said data in a different protocol processing unit 146 or 144 than the protocol processing unit 145 which is defined to operate the protocol session under observation. Often the protocol packet starting the protocol session is advantageously formed by a programmable processor that flexibly enables the performing of various operations. Often said protocol session is advantageously operated by an ASIC processor (Application Specific Integrated Circuit), which is not as flexible but typically has a capacity (operations/unit of time) that is better than the capacity of a programmable processor.

In an arrangement according to an embodiment of the invention third network element 103 is arranged to transmit to the network element 101 data, on the basis of which the selection identifier can be formed in the network element 101. In this embodiment, the network element 103 serves as the managing network element that can start a protocol session between the network elements 101 and 102.

The protocol session A can be started for example according to the following procedure, where it is assumed that the network element 103 starts said protocol session:

without restricting the general nature of the example it can be assumed that the protocol session A to be started is in the network element 101 operated by the protocol processing unit 141, and the network element 102 is operated by the protocol processing unit 145, the network element 103 transmits to the network element 101 a protocol packet containing the data T145 that identifies the protocol processing unit 145 of the network element 102, the network element 103 transmits to the network element 102 a protocol packet containing the data T141 that identifies the protocol processing unit 141 of the network element 101, the network element 101 receives a protocol packet, on the basis of which the network element 101 performs operations connected to the starting of a protocol session, such as the starting of required computer programs, the network element 102 receives a protocol packet, on the basis of which the network element 102 performs operations connected to the starting of a protocol session, such as the starting of required computer programs, on the basis of the data T145 contained in the received protocol packet, the network element 101 forms the selection identifier V145, on the basis of the data T141 contained in the received protocol packet, the network element 102 forms the selection identifier V141.

After the initial step described above, the network element 102 provides the protocol packets to be transmitted and connected to the protocol session A with the selection identifier V141, and the network element 101 provides the protocol packets to be transmitted and connected to the protocol session A with the selection identifier V145.

In an arrangement according to an embodiment of the invention, the network elements 101 and 102 are set manually to the selection identifiers V145 and V141. In that case the network elements of the data network need not mutually exchange data T141 and T145 connected to the selection of identifiers.

In an arrangement according to an embodiment of the invention, the network element 102 is arranged to conduct the received protocol packet to a predetermined protocol processing unit of the network element 102 as a response to a situation, where the protocol processing unit 145 of the network element 102 operating the protocol session represented by said protocol packet has not been successfully defined on the basis of the selection identifier contained by said protocol packet.

In an arrangement according to an embodiment of the invention, the network element 102 is arranged to process the received protocol packet (for example the protocol packet 131) in that protocol processing unit 144 that has received said protocol packet 131, as a response to a situation, where the protocol processing unit 145 of the network element 102 operating the protocol session represented by said protocol packet has not been successfully defined on the basis of the selection identifier contained by said protocol packet.

In an arrangement according to an embodiment of the invention, the network element 102 is arranged to reject the received protocol packet as a response to a situation, where the protocol processing unit 145 of the network element 102 operating the protocol session represented by said protocol packet has not been successfully defined on the basis of the selection identifier contained by said protocol packet.

In an arrangement according to an embodiment of the invention, the protocol processing unit that is identified by the selection identifier is one of the following: a router line card, a router switch card or a router control card. The protocol processing unit can include sub-units, in which case there can arise a need to conduct the received protocol packet to a given sub-unit. In that case the protocol processing unit can for example keep a local session mode table that connects each protocol session to a logically appropriate sub-unit. Such a local session mode table is essentially smaller than a session mode table that comprises all protocol sessions operated by the network element. The sub-unit can be for example a the processor of a multi-processor control card of the router.

In an arrangement according to an embodiment of the invention, the protocol processing unit that is identified by the selection identifier is a protocol processor.

In an arrangement according to an embodiment of the invention, the protocol session is a BFD session (Bi-directional Forwarding Detection protocol). The selection identifier connected to the protocol packet to be transmitted is preferably included in the BFD protocol guest discriminator (Your_Discriminator). The data on the basis of which the second network element participating the protocol session forms the selection identifier is preferably included in the BFD protocol self-discriminator (My_Discriminator), so that said information as such serves as a selection identifier. In that case the self-discriminator of the received protocol packets can be copied to the guest discriminator of the protocol packets to be transmitted. Said information can be included in the self-discriminator, and the selection identifier can be included in the guest discriminator, for example so that said data is represented by predetermined bits in the self-discriminator, and respectively the selection identifier is represented by predetermined bits in the guest discriminator.

In an arrangement according to an embodiment of the invention, the protocol session is realized by means of 'Hello' packets of the RSVP protocol (Resource reservation Protocol).

In an arrangement according to an embodiment of the invention, the protocol session is realized by means of ICMP packets (Internet Control Message Protocol).

Figure 2:
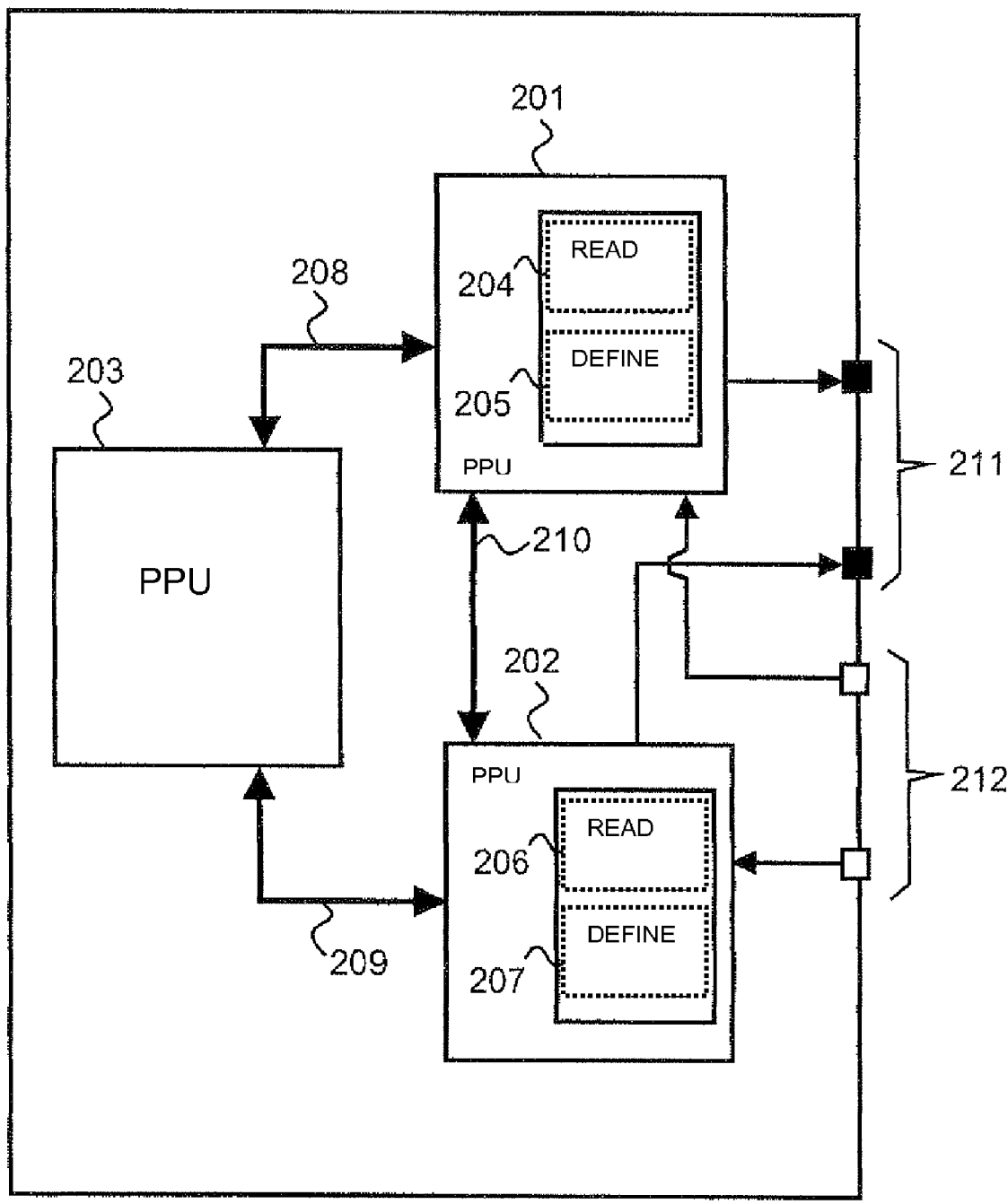
FIG. 2 illustrates a data network element according to an embodiment of the invention.

FIG. 2 illustrates a network element of a data network according to an embodiment of the invention. The network element includes protocol processing units 201-203, transmission ports 211 for data transmission packets and reception ports 212 for data transmission packets. The network element has reading means 204, 206 for reading the selection identifier contained in the received protocol packet. The network element has definition means 205, 207 for defining the protocol processing unit 201, 202 or 203 operating the protocol session from among the group of protocol processing units 201-203 of the network element on the basis of said selection identifier, and the possible values of said selection identifier are arranged to fulfill the following conditions: for each protocol processing unit 201, 202 or 203 of the network element, there is respectively arranged no more than a predetermined number of selection identifier values, and at least one of the selection identifier values is available for use in connection with at least two simultaneous protocol sessions. Advantageously at most one selection identifier value is arranged to correspond to each protocol processing unit of the network element. The network element includes transmission means 208-210 for transmitting at least part of the information contained in the received protocol packet to the protocol processing unit operating the protocol session.

The dotted lines representing the reading means 204, 206 and the definition means 205, 207 in FIG. 2 show that the reading means 204 and the definition means 205 can be realized either by one and the same physical device, or by separate physical devices. Respectively the reading means 206 and the definition means 207 can be realized either by one and the same physical device or by separate physical devices.

In a network element according to an embodiment of the invention, the reading means 204 (or 206) and the definition means 205 (or 207) are realized as one or more of the following: an Application Specific Integrated Circuit, a programmable network processor, general purpose programmable processor or a Field Programmable Gate Array.

In a network element according to an embodiment of the invention, the definition means 205, 207 are arranged to conduct the received protocol packet to a predetermined protocol processing unit 201, 202 or 203 as a response to a situation, where the protocol processing unit operating said protocol session has not been successfully defined on the basis of the selection identifier contained by said protocol packet.

A network element according to a preferred embodiment of the invention is arranged to process the received protocol packet in that protocol processing unit 201 or 202 that has received said protocol packet from the reception port, as a response to a situation, where the protocol processing unit operating said protocol session has not been successfully defined on the basis of the selection identifier contained by said protocol packet.

A network element according to an embodiment of the invention is arranged to reject the received protocol packet as a response to a situation, where the protocol processing unit operating said protocol session has not been successfully defined on the basis of the selection identifier contained by said protocol packet.

A network element according to an embodiment of the invention is a router that advantageously supports the internet protocol (IP).

A network element according to an embodiment of the invention is an Ethernet switch.

A network element according to an embodiment of the invention is an ATM switch (Asynchronous Transfer Mode).

Figure 3:
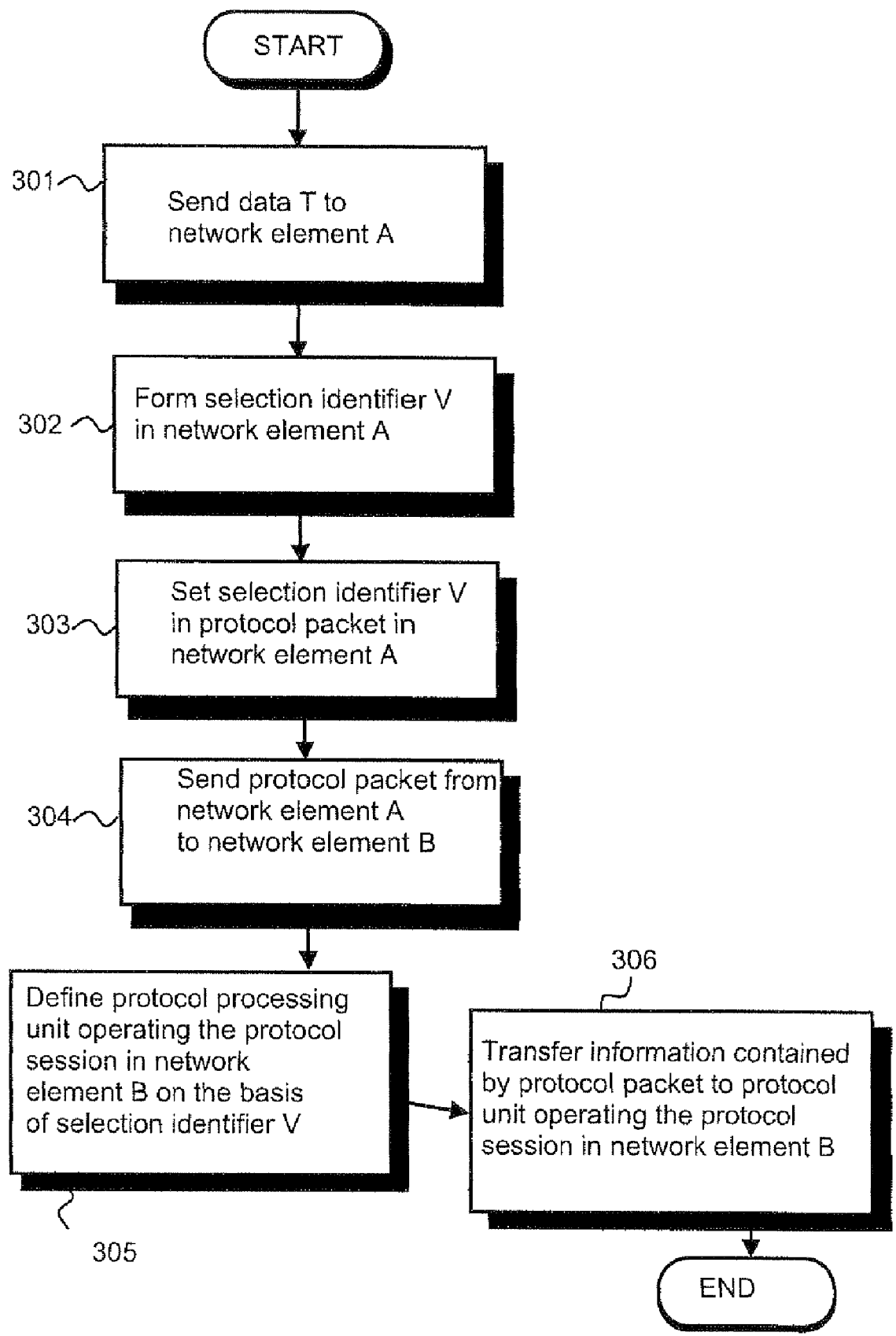
FIG. 3 is a flowchart illustrating a method according to the invention for processing protocol packets.

FIG. 3 is a flowchart illustrating a method according to an embodiment of the invention for processing protocol packets. The flowchart describes the processing of one protocol packet. In step 303, the protocol packet connected to the protocol session is in the first network element A provided with a selection identifier V, the possible values of which are arranged to fulfill the following conditions: for each protocol processing unit of the second network element B, there is respectively arranged no more than a predetermined number of selection identifier values, and at least one of the selection identifier values is available for use in connection with at least two simultaneous protocol sessions. Preferably at most one of the selection identifier values is arranged to correspond to each protocol processing unit of the network element B. In step 304, said protocol packet is transmitted from the network element A to the network element B. In step 305, the protocol processing unit operating said protocol session is defined from among the protocol processing units of the network element B on the basis of the selection identifier V. In step 306, at least part of the information contained in said protocol packet is transmitted to the protocol processing unit operating said protocol session in the network element B.

In a method according to a preferred embodiment of the invention, to the network element A there is transmitted 301 from the network element B data T, on the basis of which the selection identifier V is formed 302 in the network element A.

In a method according to a preferred embodiment of the invention, the data transmission packet containing the data T is formed in the network element B in a different protocol processing unit than the protocol processing unit operating said protocol session. Often the protocol packet starting the protocol session is advantageously formed by a programmable processor that flexibly enables the performing of various operations. Often said protocol session is advantageously operated by an ASIC processor (Application Specific Integrated Circuit), which is not as flexible, but has a capacity (operations/time unit) that is typically better than the capacity of a programmable processor.

In a method according to a preferred embodiment of the invention, to the network element A there is transmitted 301 from a third network element C data T, on the basis of which the selection identifier V is formed 302 in the network element A.

In a method according to a preferred embodiment of the invention, the network elements are manually given the selection identifiers connected to the protocol sessions. Now the steps 301 and 302 are not needed, because the network elements of the data network need not mutually exchange the data T connected to the selection identifier.

In a method according to a preferred embodiment of the invention, the received protocol packet is in the network element conducted to a predetermined protocol processing unit as a response to a situation, where the protocol processing unit operating said protocol session has not been successfully defined on the basis of the selection identifier V contained by said protocol packet.

In a method according to a preferred embodiment of the invention, the received protocol packet is processed in that protocol processing unit of the network element that has received said protocol packet, as a response to a situation, where the protocol processing unit operating said protocol session has not been successfully defined on the basis of the selection identifier V contained by said protocol packet.

In a method according to a preferred embodiment of the invention received protocol packet is rejected as a response to a situation, where the protocol processing unit operating said protocol session has not been successfully defined on the basis of the selection identifier V contained by said protocol packet.

In a method according to a preferred embodiment of the invention, the protocol processing unit determined on the basis of the selection identifier V is one of the following: a router line card, a router switch card or a router control card.

In a method according to a preferred embodiment of the invention, the protocol processing unit determined on the basis of the selection identifier V is a protocol processor.

In a method according to a preferred embodiment of the invention, the protocol session is a BFD session (Bi-directional Forwarding Detection protocol) and said selection identifier is included in the BFD protocol guest discriminator (Your_Discriminator).

In a method according to a preferred embodiment of the invention, the protocol session is realized by means of 'Hello' packets of the RSVP protocol (Resource reservation Protocol).

In a method according to a preferred embodiment of the invention, the protocol session is realized by means of ICMP packets (Internet Control Message Protocol).

A computer program according to an embodiment of the invention for processing protocol packets includes the following program means:
program means for instructing a network element in a data network to read the selection identifier in a received protocol packet representing a protocol session,
program means for instructing said network element to define the protocol processing unit operating said protocol session from among a group of the protocol processing units of said network element on the basis of said selection identifier, the possible values of which selection identifier are arranged to fulfill the following conditions: for each protocol processing unit of said network element, there is respectively arranged no more than a predetermined number of the selection identifier values, and at least one of the selection identifier values is available for use in connection with at least two simultaneous protocol sessions, and
program means for instructing said network element to transmit at least part of the information contained in said protocol packet to the protocol processing unit operating said protocol session.

Said program means can be for example sub-programs or functions.

A computer program according to an embodiment of the invention is recorded in a readable recording device of the processor, for example in an optical disk (CD, Compact Disk).

The computer program according to an embodiment of the invention is a set of electric data proceeding in a data transmission device.

Figure 4:
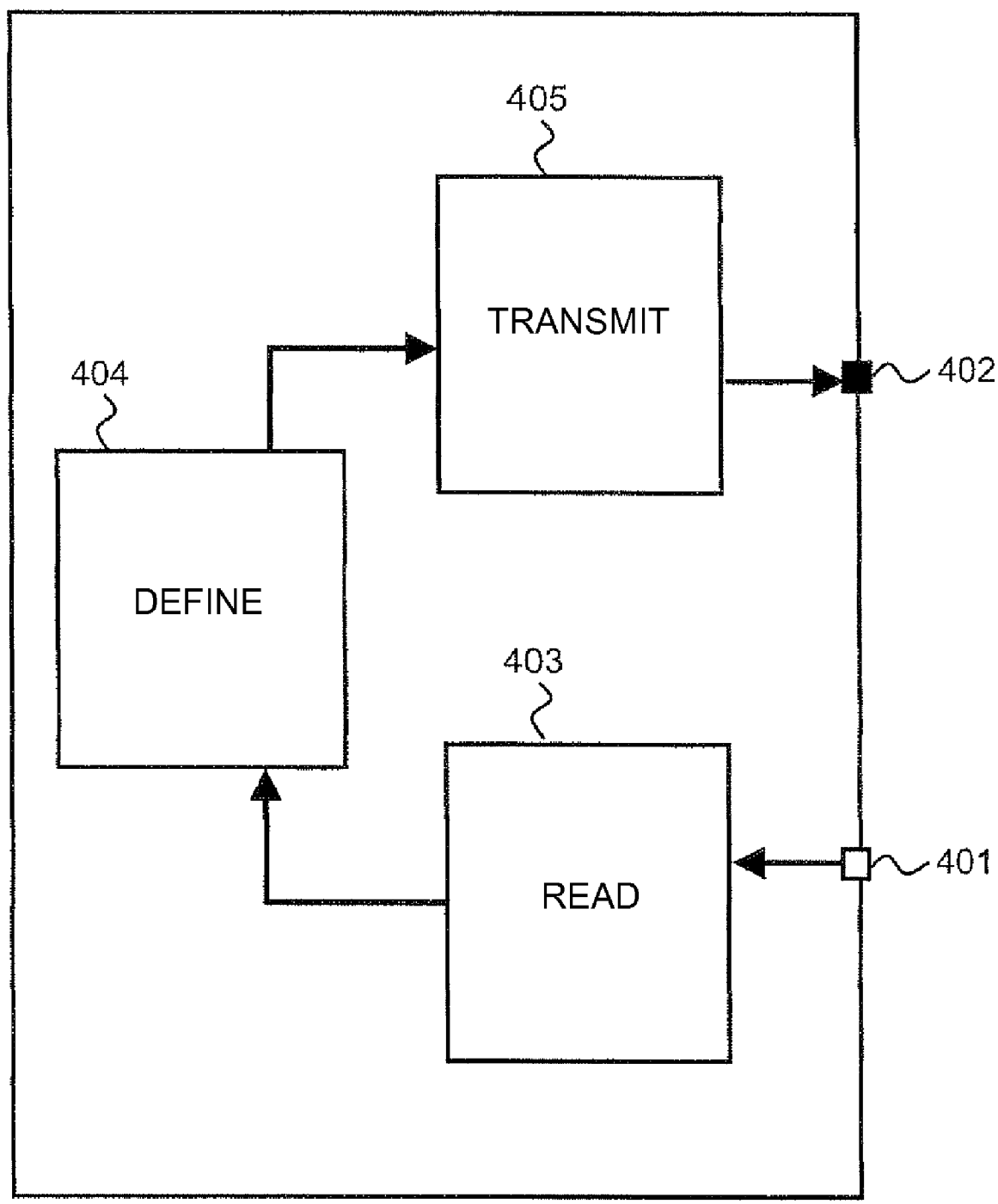
FIG. 4 illustrates a protocol processor according to an embodiment of the invention for processing protocol packets.

FIG. 4 illustrates a protocol processor according to an embodiment of the invention for processing protocol packets. The protocol processor has an input port 401 and an output port 402. The protocol processor includes reading means 403 for reading the selection identifier from the protocol packet received from the inlet port 401 representing the protocol session. The protocol processor has definition means 404 for defining the protocol processing unit operating said protocol session from among the group of protocol processing units of the network element on the basis of said selection identifier, the possible values of which selection identifier are arranged to fulfill the following conditions: for each protocol processing unit of the network element, there is respectively arranged no more than a predetermined number of selection identifier values, and at least one of the selection identifier values is available for use in connection with at least two simultaneous protocol sessions. The protocol processor includes transmission means 405 for transmitting at least part of the information contained in said protocol packet to said outlet port 402.

A protocol packet according to an embodiment of the invention is realized as one or more of the following: an Application Specific Integrated Circuit or a Field Programmable Gate Array.

For a man skilled in the art, it is obvious that the invention and its various embodiments are not restricted to the above described embodiments only, but the invention and its embodiments can be modified within the scope of the independent claim.

The invention claimed is:

1. A method for processing protocol packets, the method comprising:
providing via a processor, in a first network element, a protocol packet connected to a Bi-directional Forwarding Detection protocol session with a selection identifier, the Bi-directional Forwarding Detection protocol session controlling that a data transmission link between network elements, a route between two points in a data network, or a tunnel defined in the data network is in proper order for operation, and the values of the selection identifier being arranged to fulfill the following conditions: each protocol processing unit included in the second network element is arranged to correspond to no more than a predetermined number of selection identifier values, and at least one of the selection identifier values is available for use in connection with at least two simultaneous Bi-directional Forwarding Detection protocol sessions,
transmitting said protocol packet from said first network element to said second network element,
defining via a processor, in said second network element and on the basis of said selection identifier, a protocol processing unit operating said Bi-directional Forwarding Detection protocol session from among the protocol processing units of said second network element, and
transmitting, in said second network element, at least part of the information contained by said protocol packet to the protocol processing unit operating said Bi-directional Forwarding Detection protocol session to deliver the at least part of the information contained by said protocol packet to the correct protocol processing unit from among the group of protocol processing units of said second network element.

2. The method according to claim 1, wherein to said first network element there is transmitted data from said second network element, on the basis of which data said selection identifier is formed in said first network element.

3. The method according to claim 2, wherein the data transmission packet containing said data is formed in said second network element, in a different protocol processing unit than the protocol processing unit operating said Bi-directional Forwarding Detection protocol session.

4. The method according to claim 1, wherein to said first network element, there is transmitted data from a third network element, on the basis of which data said selection identifier is formed in said first network element.

5. The method according to claim 1, wherein said protocol packet is conducted to the protocol processing unit of said second network element, predetermined in said second network element, as a response to a situation, where the protocol processing unit operating said Bi-directional Forwarding Detection protocol session cannot be defined on the basis of said selection identifier.

6. The method according to claim 1, wherein said protocol packet is processed in that protocol processing unit of said second network element that has received said protocol packet as a response to a situation where the protocol processing unit operating said Bi-directional Forwarding Detection protocol session cannot be defined on the basis of said selection identifier.

7. The method according to claim 1, wherein said protocol packet is rejected in said second network element as a response to a situation where the protocol processing unit operating said Bi-directional Forwarding Detection protocol session cannot be defined on the basis of said selection identifier.

8. The method according to claim 1, wherein the protocol processing unit operating said Bi-directional Forwarding Detection protocol session is one of the following: a router line card, a router switch card or a router control card.

9. The method according to claim 1, wherein the protocol processing unit operating said Bi-directional Forwarding Detection protocol session is a protocol processor.

10. The method according to claim 1, wherein said selection identifier is included in the Bi-directional Forwarding Detection protocol guest discriminator (Your_Discriminator).

11. A system for processing protocol packets in a data network, comprising:
a first network element; and
a second network element,
wherein said first network element comprises a processor configured to:
provide a protocol packet connected to a Bi-directional Forwarding Detection protocol session with a selection identifier, the Bi-directional Forwarding Detection protocol session being suitable for controlling that a data transmission link between network elements, a route between two points in the data network, or a tunnel defined in the data network is in proper order for operation, and the values of the selection identifier being arranged to fulfill the following conditions:
for each protocol processing unit included in said second network element, there is respectively arranged no more than a predetermined number of selection identifier values, and at least one of the selection identifier values is available for use in connection with at least two simultaneous Bi-directional Forwarding Detection protocol sessions, and
transmit said protocol packet to said second network element,
and said second network element comprises a processor configured to:
read the selection identifier contained in the received protocol packet,
define the protocol processing unit operating said Bi-directional Forwarding Detection protocol session among the number of protocol processing units of said second network element on the basis of said selection identifier, and
transmit at least part of the information contained by said protocol packet to the protocol processing unit operating said Bi-directional Forwarding Detection protocol session to deliver the at least part of the information contained by said protocol packet to the correct protocol processing unit from among the group of protocol processing units of said second network element.

12. The system according to claim 11, wherein said second network element is arranged to transmit data to said first network element, on the basis of which data said selection identifier can be formed in said first network element.

13. The system according to claim 12, wherein said second network element is arranged to form a data transmission packet containing said data in a different protocol processing unit than the protocol processing unit operating said Bi-directional Forwarding Detection protocol session.

14. The system according to claim 11, wherein the arrangement includes a third network element that is arranged to transmit data to said first network element, on the basis of which data said selection identifier can be formed said first network element.

15. The system according to claim 11, wherein said second network element is arranged to conduct said protocol packet to a predetermined protocol processing unit of said second network element as a response to a situation, where the protocol processing unit operating said Bi-directional Forwarding Detection protocol session has not been successfully defined on the basis of said selection identifier.

16. The system according to claim 11, wherein said second network element is arranged to process said protocol packet in that protocol processing unit of said second network element that has received said protocol packet as a response to a situation where the protocol processing unit operating said Bi-directional Forwarding Detection protocol session has not been successfully defined on the basis of said selection identifier.

17. The system according to claim 11, wherein said second network element is arranged to reject said protocol packet as a response to a situation where the protocol processing unit operating said Bi-directional Forwarding Detection protocol session has not been successfully defined on the basis of said selection identifier.

18. The system according to claim 11, wherein the protocol processing unit operating said Bi-directional Forwarding Detection protocol session is one of the following: a router line card, a router switch card and a router control card.

19. The system according to claim 11, wherein the protocol processing unit operating said Bi-directional Forwarding Detection protocol session is a protocol processor.

20. The system according to claim 11, wherein said selection identifier is arranged to be included in the guest discriminator of the Bi-directional Forwarding Detection protocol (Your_Discriminator).

21. A data network element, comprising:
means for reading the selection identifier from the received protocol packet representing Bi-directional Forwarding Detection protocol session that is suitable for controlling that a data transmission link between network elements, a route between two points in a data network, or a tunnel defined in the data network is in proper order for operation,
means for defining a protocol processing unit operating said Bi-directional Forwarding Detection protocol session from among the group of the protocol processing units of the network element on the basis of said selection identifier, the possible values of said selection identifier being arranged to fulfill the following conditions:
for each protocol processing unit included in the network element, there is respectively arranged no more than a predetermined number of selection identifier values, and at least one of the selection identifier values is available for use in connection with at least two simultaneous Bi-directional Forwarding Detection protocol sessions, and means for transmitting at least part of the information contained in said protocol packet to the protocol processing unit operating said Bi-directional Forwarding Detection protocol session to deliver the at least part of the information contained by said protocol packet to the correct protocol processing unit from among the group of protocol processing units of said data network element.

22. The data network element according to claim 21, wherein said reading means and definition means are realized by one or more of the following: an Application Specific Integrated Circuit, a programmable network processor, a general purpose programmable processor and a Field Programmable Gate Array.

23. The data network element according to claim 21, wherein said definition means are arranged to conduct said protocol packet to a predetermined protocol processing unit as a response to a situation where the protocol processing unit operating said protocol session has not been successfully defined on the basis of said selection identifier.

24. The data network element according to claim 21, wherein the network element is arranged to process said protocol packet in that protocol processing unit that has received said protocol packet as a response to a situation where the protocol processing unit operating said Bi-directional Forwarding Detection protocol session has not been successfully defined on the basis of said selection identifier.

25. The data network element according to claim 21, wherein the network element is arranged to reject said protocol packet as a response to a situation where the protocol processing unit operating said Bi-directional Forwarding Detection protocol session has not been successfully defined on the basis of said selection identifier.

26. The data network element according to claim 21, wherein the network element is a router.

27. A data network element according to claim 21, wherein the network element is an Ethernet switch.

28. A computer readable recording medium having recorded in a non-transitory state thereon a computer program executed by a processor for processing protocol packets, wherein the computer program includes:

reading via a network element of a data network, a selection identifier from a received protocol packet representing a Bi-directional Forwarding Detection protocol session that is suitable for controlling that a data transmission link between network elements, a route between two points in the data network, or a tunnel defined in the data network is in proper order for operation, defining via said network element, the protocol processing unit operating said Bi-directional Forwarding Detection protocol session from among the group of protocol processing units of said network element on the basis of said selection identifier, the values of said selection identifier being arranged to fulfill the following conditions: for each protocol processing unit contained in said network element, there is respectively arranged no more than a predetermined number of selection identifier values, and at least one of the selection identifier values is available for use in connection with at least two simultaneous Bi-directional Forwarding Detection protocol sessions, and transmitting via said network element, at least part of the information contained in said protocol packet to the protocol processing unit operating said Bi-directional Forwarding Detection protocol session to deliver the at least part of the information contained by said protocol packet to the correct protocol processing unit from among the group of protocol processing units of said network element.

29. A protocol processor provided with an input port and an output port, the protocol processor comprising:

means for reading a selection identifier from the protocol packet representing a Bi-directional Forwarding Detection protocol session and received from said input port, the Bi-directional Forwarding Detection session being suitable for controlling that a data transmission link between network elements, a route between two points in the data network, or a tunnel defined in the data network is in proper order for operation, means for defining the protocol processing unit operating said Bi-directional Forwarding Detection protocol session from among a group of protocol processing units of a network element on the basis of said selection identifier, the values of said selection identifier being arranged to fulfill the following conditions: for each protocol processing unit contained in the network element, there is respectively arranged no more than a predetermined number of selection identifier values, and at least one of the selection identifier values is available for use in connection with at least two simultaneous Bi-directional Forwarding Detection protocol sessions, and means for transmitting at least part of the information contained in said protocol packet to said output port to deliver the at least part of the information contained by said protocol packet to the correct protocol processing unit from among the group of protocol processing units of said network element.

\* \* \* \* \*